July 9, 1940.  A. H. CAIN  2,207,655

WELDING TORCH

Original Filed June 23, 1936

Inventor

A. H. Cain

By Clarence A O'Brien and
Hyman Berman
Attorneys

UNITED STATES PATENT OFFICE 2,207,655

WELDING TORCH

Albert H. Cain, Roodhouse, Ill.

Application June 23, 1936, Serial No. 86,849
Renewed December 6, 1939

6 Claims. (Cl. 158—27.4)

My invention relates generally to the art of welding and particularly to the oxy-acetylene type of welding wherein a third inert gas is utilized to overcome and prevent the formation of oxides on the welded area which ordinarily form by reason of the contact of the hot metal and the air, and an important object of the invention is to provide a welding torch of the character indicated which produces a jet of inert gas in a manner to cause surrounding of the oxy-acetylene flame to form a shield of inert gas which excludes the air from the molten metal at the area being welded.

Another important object of my invention is to provide an oxy-acetylene type of welding torch which includes a jet for utilizing inert gas such as nitrogen for producing an air-excluding shield around the area being welded.

Other important objects of my invention will be apparent from a reading of the following description in connection with the drawing, wherein for purposes of illustration I have set forth preferred embodiments of my invention.

Figure 1:
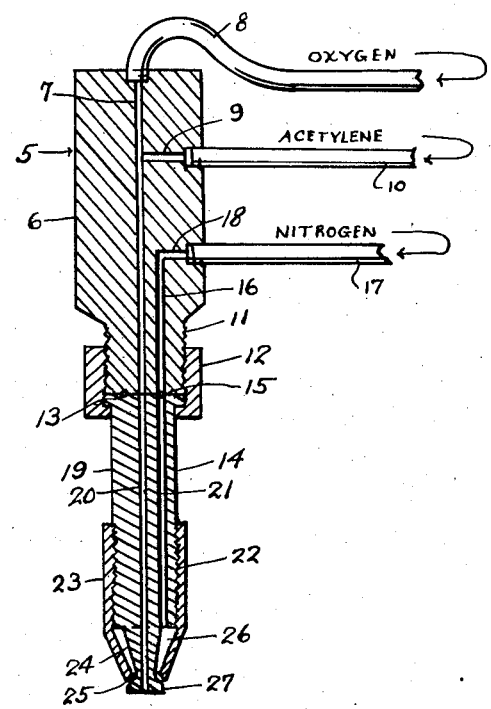
Figure 1 is a general transverse sectional view taken through a torch in accordance with the present invention.
Figure 2:
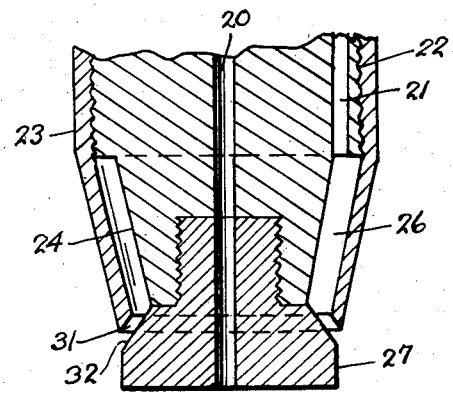
Figure 2 is a similar sectional view enlarged of the inert gas shield producing tip.

Referring in detail to the drawing, the numeral 5 generally designates the torch which includes the body 6 which has a central bore 7 to the outer end of which is connected the pipe 8 which feeds oxygen thereto. At some distance from the upper end of the body 5 a branch 9 leads from the bore 7 laterally through the side of the body and has connected to the radially outward end thereof the acetylene line 10, whereby a mixture of oxygen and acetylene gases travels through the bore 7.

The lower part of the body 6 is reduced and externally threaded as indicated by the numeral 11 to receive a socket coupling 12 thereon which sockets the flanged upper end 13 of the tip which is generally designated 14. A suitable ground joint 15 is interposed between the tip 14 and the lower end of the reduced portion 11.

A nitrogen conveying bore 16 is eccentrically arranged in the body 6 parallel to the bore 7 and has a lateral branch 18 whose outer end is connected to the nitrogen pipe 17. The tip 14 comprises the rod element 19 with the flange 13 on its upper end, and the rod element 19 has a central longitudinal bore 20 adapted to register with the bore 7 and an eccentric nitrogen conveying bore 21 adapted to register with counter bore and the lower end of the bore 16.

The lower part of the rod element 19 is exteriorly threaded as indicated by the numeral 22 and thereon is threaded the sleeve 23 whose lower end is tubular and tapered as indicated by the numeral 24.

The extreme lower end of the rod 19 is reduced and tapered as indicated by the numeral 25 and on one side has a longitudinal opening 26 into which the lower end of the passage 21 opens into the annular wedge-shaped cross section space which is defined by the interior of the tapered portion 24 of the sleeve 23 and the reduced portion 24.

The lower end of the tapered portion of the sleeve is beveled as indicated by the numeral 31 to generally conform with the taper of the peripheral part 32 of the mushroom head 27 which threads into place, and the nitrogen coming through the passage 21 and into the chamber mentioned is caused to be expelled around the head 27 in a hollow cone form so as to form a shield around the flame which is generated at the terminal of bore 20, thereby shielding the part of the metal directly contacted by the flame, from contact with the atmosphere.

Figure 3:
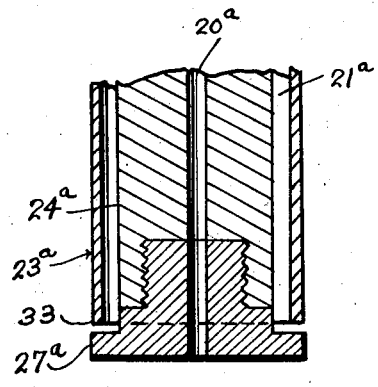
Figure 3 is a similar sectional view through a modified form of tip.

Referring to Figure 3 there is shown a modified form of the invention in which the lower part of the body 19 is straight or cylindrical as indicated by the numeral 24a and provided on its lower end with a lateral annular flange 24a instead of the head 27; and the sides of the sleeve 23a are straight tubular instead of being inwardly tapered and their lower edges terminate as indicated by the numeral 33 in spaced relation to the upper side of the flange 27a. The tip body has the oxy-acetylene conveying passage 20a and concentrically therewith the nitrogen conveying passage 21a. It is obvious that the nitrogen issuing from the aperture between the lower edges 33 of the sleeve 23a and the flange 27a cause a flat cone shield which surrounds and envelopes the area being welded by application of the flame issuing from bore 28.

Although I have shown and described preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:

1. In a torch for welding and like operations, a body formed with a main passage having an oxygen branch and an acetylene branch, a nitrogen passage unconnected with said main gas passage, said main gas passage and said nitrogen passage opening through one end of said body, a tip on the said end of the body and formed with a first duct registrable with said main passage and a second duct registrable with said nitrogen passage, means connecting said tip to said body, the free end of said tip having a reduced portion formed at its extremity with a spreading head, and a sleeve on said free end of the tip and having a portion surrounding and spaced from said reduced portion and said spreading head, said portion of the sleeve and said reduced portion defining a nitrogen chamber, said first duct having a discharge opening through said head and said second duct having a discharge opening into said chamber.

2. In a torch for welding and like operations, a body having a tip formed with a reduced portion having a spreading head, a sleeve on said body surrounding and spaced from said reduced portion and said head and thereby defining a shielding gas chamber, a main gas passage extending through said body and tip and discharging through said head, and a shielding gas passage in said body supplying said shielding gas chamber.

3. In a torch for welding and like operations, a body having a tip formed with a reduced portion having a spreading head, a sleeve on said body surrounding and spaced from said reduced portion and said head and thereby defining a shielding gas chamber, a main gas passage extending through said body and tip and discharging through said head, and a shielding gas passage in said body supplying said shielding gas chamber, said shielding gas chamber being tapering in form.

4. In a torch for welding and like operations, a body having a tip formed with a reduced portion having a spreading head, a sleeve on said body surrounding and spaced from said reduced portion and said head and thereby defining a shielding gas chamber, a main gas passage extending through said body and tip and discharging through said head, and a shielding gas passage in said body supplying said shielding gas chamber, said shielding gas chamber being plain cylindical in form.

5. In a torch for welding and like operations, a body having a tip formed with a reduced portion having a spreading head, a sleeve on said body surrounding and spaced from said reduced portion and said head and thereby defining a shielding gas chamber, a main gas passage extending through said body and tip and discharging through said head, and a shielding gas passage in said body supplying said shielding gas chamber, the axially inward side of said head being substantially frustro-conical.

6. In a torch for welding and like operations, a body having a tip formed with a reduced portion having a spreading head, a sleeve on said body surrounding and spaced from said reduced portion and said head and thereby defining a shielding gas chamber, a main gas passage extending through said body and tip and discharging through said head, and a shielding gas passage in said body supplying said shielding gas chamber, the axially inward side of said head being substantially flat.

ALBERT H. CAIN.